United States Patent [19]

Bray

[11] Patent Number: 4,545,843

[45] Date of Patent: Oct. 8, 1985

[54] METHOD OF MANUFACTURING ADHESIVE TAPE

[76] Inventor: David Bray, 2198 Corsair Rd., Mississauga, Ontario, Canada, L5A 2L8

[21] Appl. No.: 523,020

[22] Filed: Aug. 15, 1983

[30] Foreign Application Priority Data

Sep. 1, 1982 [CA] Canada ................................. 410552

[51] Int. Cl.⁴ ................................................. B32B 7/00
[52] U.S. Cl. ................................ 156/322; 156/244.11; 156/244.24; 156/324; 156/327; 427/208.4; 428/261; 428/354
[58] Field of Search ............... 427/207.1, 208.4, 208.8; 428/317.1, 317.3, 261, 354; 156/244.11, 289, 334, 327, 332, 244.24, 244.19, 322, 324

[56] References Cited

U.S. PATENT DOCUMENTS

| 2,487,060 | 11/1949 | Dike ........................... 427/208.8 X |
| 3,552,994 | 1/1971 | Dipner .......................... 428/261 X |
| 3,959,562 | 5/1976 | Hackhel ....................... 427/208.4 X |
| 4,304,813 | 12/1981 | Elmore ......................... 428/261 X |
| 4,308,313 | 12/1981 | Groff .......................... 427/288.4 X |
| 4,439,482 | 3/1984 | Suematsu ...................... 428/354 X |

FOREIGN PATENT DOCUMENTS

| 889260 | 12/1971 | Canada . |
| 2641128 | 3/1978 | Fed. Rep. of Germany . |
| 1523678 | 3/1968 | France . |
| 2294841 | 7/1976 | France . |

Primary Examiner—David Simmons
Attorney, Agent, or Firm—Auslander and Thomas

[57] ABSTRACT

Adhesive tape is manufactured by laminating at least one layer of a heat activated adhesive film to one layer of a substrate material, and coating the thereby obtained laminate with a pressure sensitive adhesive. Because the substrate is laminated with a film, typically a random copolymer of ethylene and acrylic acid, the adhesive which is thereafter coated on the laminate will not flow through the substrate, even if a porous substrate is used.

22 Claims, 5 Drawing Figures

METHOD OF MANUFACTURING ADHESIVE TAPE

The present invention relates to the field of adhesive tape manufacture and provides a novel method of manufacturing adhesive tape and the tape thereby manufactured.

Traditionally, adhesive tape has been manufactured by applying a pressure sensitive adhesive directly onto a substrate material, and then winding the adhesive coated substrate into a roll. The adhesive can be applied to substrate in any one of a number of ways including emulsion, solvent spread, hot melt and calendering. Each of these methods is well known and has been described in the available literature. The substrate materials include woven cloth, scrim (unwoven cloth), paper, foil, fibreglass cloth, and various other porous and non-porous substrates.

In the manufacture of cloth tape, it has heretofore been necessary to utilize the most expensive adhesive application system, calendering, and, as a substrate material, a woven cloth with a fairly dense thread count, in order that the adhesive would not tend to flow through the substrate when it was applied, thereby making it impossible to wind the tape into a roll which could later be unwound.

That is, if any of the other three adhesive application systems is used with a cloth substrate, the adhesive, which is in a liquid state when applied, tends to flow through the cloth and when the cloth tape is afterwards wound into a roll, it cannot be unwound. Furthermore, when a calender is used, a fairly strong cloth must be used as a substrate, because of the large pressures generated by a calender.

With regard to substrate materials other than woven cloth, the principle problem has been that substrate materials such as paper, foil, PVC, or scrim tend to be either too weak and fragile to provide a first quality tape, or too thick to be feasibly and economically rolled into a tape.

It is the object of the present invention to overcome the above disadvantages and provide a method of inexpensively manufacturing a cloth tape with a low thread count, and of manufacturing strong, light tape from substrate materials such as foil, paper, PVC and scrim.

The present invention therefore provides a method of manufacturing adhesive tape comprising the steps of laminating at least one layer of a heat activated adhesive film to at least one layer of a substrate material at a temperature of between 200° and 500° F. to form a laminate and coating the thereby formed laminate with a pressure sensitive adhesive to obtain an adhesive tape.

The present invention may be described with reference to the accompanying diagrams.

Figure 1:
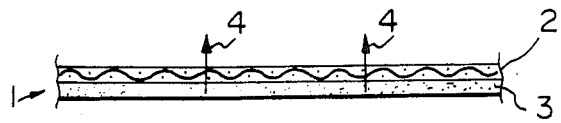
FIG. 1 is a cross sectional view of a cloth tape manufactured by traditional methods.
Figure 2:
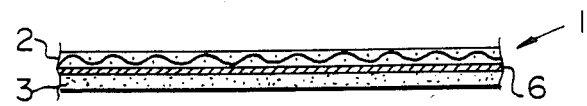
FIG. 2 is a cross sectional view of cloth tape manufactured in accordance with the present invention.

Referring to FIG. 1, it can be seen that cloth tape 1 made according to traditional methods is comprised of two layers, a cloth layer 2 and a layer of pressure sensitive adhesive 3. However, cloth is by its very nature porous, and there is a tendency in cloth tape 1 for the adhesive 3 to flow through the cloth layer 2, as indicated by example at 4. Manufacturers of tape have therefore used a woven cloth with a fairly dense thread count in order to prevent the flow of adhesive 3 through cloth 2. This has proved to be quite expensive. In addition, cloth tape has, by necessity, been manufactured on calenders because alternate methods of adhesive application namely emulsion, solvent spread and hot melt are incompatable with a substrate material as porous as even dense cloth. Referring next to FIG. 2, the cloth tape 1 of the present invention includes at least 3 layers, a cloth layer 2, an adhesive layer 3, and a heat activated film adhesive layer 6 interposed between the cloth 2 and the adhesive 3. Heat activated adhesive film layer 6 acts as a block and prevents the flow of adhesive 3 into and through cloth 2. Film 6 also increases the tensile strength of cloth 2. A cloth with a less dense thread count than previously used may therefore be used to manufacture tape, with no accompanying decrease in the tensile strength of the tape.

In a similar way, if a fragile substrate, such as aluminum foil is used instead of cloth 2, the tensile strength of the foil will be increased. It is therefore possible, with the present invention, to manufacture a relatively strong tape using, as a substrate, a fragile material.

Film 6 is a random copolymer of ethylene and acrylic acid, such as Dow (trade mark) 599, or Dow 804. Film 6 may contain some ethyl vinyl acetate as well.

It should be noted that the heat activated adhesive film used in the present invention is typically 1 mil thick, although satisfactory results have been obtained using films of from 0.5 mil to 6 mil in thickness.

Figure 3:
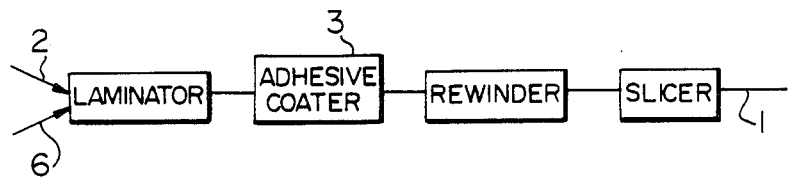
FIG. 3 is a block diagram of a preferred embodiment of the method of the present invention.

Referring to FIG. 3, the method of the present invention may be summarized as follows:

(i) a wide roll of substrate material 2 and wide roll heat activated adhesive film are laminated at the "LAMINATOR", at between 200° F. and 500° F. to form a substrate film laminate;

(ii) at the "ADHESIVE COATER", a pressure sensitive adhesive is coated, usually on the film side of the laminate to form a pressure sensitive adhesive tape;

(iii) the tape, which is at this point still in a wide sheet, is either wound into jumbo rolls on a turret take-off or winder, and then if desired, rewound into logs of predetermined lengths and core sizes, on the "REWINDER";

(iv) the jumbo rolls are then rewound, slit into finished rolls of tape on cores of desired sizes, or in logs of predetermined lengths and core sizes which are Balogna sliced into finished rolls of tape at the "SLICER".

Figure 4:
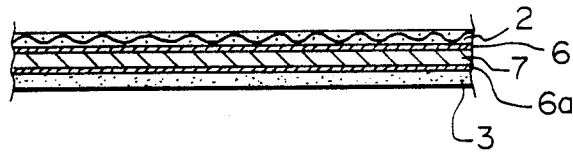
FIG. 4 is a cross sectional view of a tape manufactured according to the present invention and employing two layers of substrate materials.

Referring to FIG. 4, it can be seen that in another embodiment, the present invention includes a cloth substrate 2 laminated to a film layer 6. Instead of coating film 6 with adhesive, however, the substrate-film laminate is laminated to a second substrate layer 7, and to a second film layer 6a. Adhesive 3 is then coated on a second film layer 6a. It will be understood that cloth 2 may be replaced by any other substrate material, including paper, foil, polyester, or polyethylene sheeting. Second substrate 7 may be foam, polyethylene sheeting or any other desired substrate. If, for example, cloth 2 is replaced by a foil layer, and second substrate 7 is a foam layer, an insulating duct tape with a high tensile strength is obtained. If cloth 2 is replaced by a polyethylene sheet, and second substrate 7 is a cloth layer, a polyethylene coated cloth tape is obtained. It is clear that any number of combinations of substrate materials are possible, depending on the properties one wishes to impart to the finished tape product.

It is also within the scope of the present invention to apply a release paper to the adhesive of the tape of the present invention, so that the tape of the present invention may be used in applications other than rolled tape. An example of this type of application is shown in FIG. 5.

Figure 5:
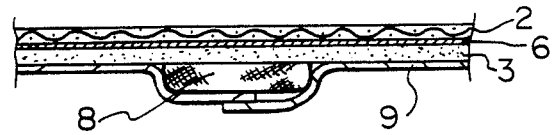
FIG. 5 is a cross sectional view of an adhesive bandage manufactured according to the present invention.

In FIG. 5, pad 8, which is made of any sterile absorbant material, such as sterile cotton is applied to the adhesive layer 3 of tape 5. Release paper 9 is then applied over adhesive layer 3. The resultant product may then be cut into bandages. Bandages manufactured according to this process may incorporate a thinner, and therefore less expensive cloth layer 2 than has heretofore been possible. In addition, cloth bandages may be manufactured, without the use of calendering, with less expensive hot melt, emulsion or solvent spread adhesive application techniques.

I claim:

1. A method of manufacturing adhesive tape including the following steps:
   (a) laminating at least one layer of a substrate material to at least one layer of a heat activated adhesive film at a temperature of between 200° F. and 500° F. to obtain a laminate having a first surface of substrate material and a second surface of heat activated adhesive film; and
   (b) coating said second surface of said laminate with a pressure sensitive adhesive to obtain an adhesive tape, wherein said heat activated adhesive film comprises a random co-polymer of ethylene and acrylic acid.

2. A method as claimed in claim 1, wherein said substrate is chosen from the group including woven synthetic or natural cloth, scrim, foil, paper, foam, fibreglass, polyester, or polyethylene sheeting.

3. A method as claimed in claim 2, wherein the said heat activated film also contains ethyl vinyl acetate.

4. A method as claimed in claim 3, wherein the said film contains from 83%-93% ethylene, from 5%-15% acrylic acid and 0%-7% ethyl vinyl acetate.

5. A method as claimed in claim 3, wherein the said film contains 88% ethylene, 10% acrylic acid, and 2% ehtyl vinyl acetate.

6. A method as claimed in claim 5, wherein the said film is from 0.5 mil to 6 mil thick.

7. A method as claimed in claim 5, wherein the said film is from 0.5 to 2 mil thick.

8. A method as claimed in claim 5, wherein the said film is 1 mil thick.

9. A method as claimed in claim 6, 7 or 8, including the further steps of:

(c) winding the thereby obtained tape into wide jumbo rolls, or logs of predetermined lengths and core sizes; and
   (d) rewind slitting the said jumbo rolls or Balogna slicing the log rolls of predetermined lengths and core sizes to obtain rolls of adhesive tape.

10. A method as claimed in claim 6, 7 or 8 including the further step of applying a release paper to the said pressure sensitive adhesive.

11. A method as claimed in claim 6, 7 or 8, wherein two layers of substrate material are laminated to two layers of said heat activated adhesive film, there being one layer of heat activated film between the two said substrate layers, and one layer of heat activated adhesive film on the outside of a selected substrate layer.

12. Adhesive tape including at least one layer of a substrate material, at least one layer of a heat sensitive adhesive film comprising a random co-polymer of ethylene and acrylic acid laminated thereto and a layer of pressure sensitive adhesive, said substrate layer and said heat activated adhesive film layer together forming a laminate having a first surface of substrate material and a second surface of heat activated adhesive film, and said pressure sensitive adhesive layer being applied to said second surface.

13. Adhesive tape as claimed in claim 12, wherein said substrate material is chosen from the group including woven synthetic or natural cloth, scrim, foil, paper, foam, fibreglass, polyester, or polyethylene sheeting.

14. Adhesive tape as claimed in claim 13, wherein said heat activated adhesive film also contains ethyl vinyl acetate.

15. Adhesive tape as claimed in claim 14, wherein said heat activated adhesive film contains from 83%-93% ethylene, from 5%-15% acrylic acid and from 0%-7% ethyl vinyl acetate.

16. Adhesive tape as claimed in claim 14, wherein said heat activated adhesive film contains 88% ethylene, 10% acrylic acid and 2% ethyl vinyl acetate.

17. Adhesive tape as claimed in claim 16, wherein said heat activated adhesive film is from 0.5 mil to 6 mil thick.

18. Adhesive tape as claimed in claim 16, wherein said heat activated adhesive film is from 0.5 to 2 mil thick.

19. Adhesive tape as claimed in claim 16, wherein said heat activated adhesive film is 1 mil thick.

20. Adhesive tape as claimed in claims 17, 18 or 19, further including a layer of release paper detachably applied to said pressure sensitive adhesive layer.

21. Adhesive tape as claimed in claims 17, 18 or 19, wherein said laminate includes two layers of substrate material and two layers of heat activated adhesive film, one layer of said heat activated adhesive film being between said substrate material layers.

22. A roll of a predetermined length of adhesive tape as claimed in claims 17, 18, or 19, said tape being wound onto a core of predetermined size, and cut to a desired width.

* * * * *